United States Patent
Prelletz

[15] 3,693,907
[45] Sept. 26, 1972

[54] FILM CONVOLUTION RETAINING DEVICE

[72] Inventor: Edward R. Prelletz, Chicago, Ill.

[73] Assignee: Bell & Howell Company, Chicago, Ill.

[22] Filed: Feb. 2, 1970

[21] Appl. No.: 7,715

[52] U.S. Cl. .................................................242/197
[51] Int. Cl. ..............................................G11b 23/04
[58] Field of Search......242/197, 199, 55.2, 68.7, 71, 242/71.1, 71.2, 71.8, 74, 74.1, 74.2, 125.2; 206/52, 53

[56] References Cited

UNITED STATES PATENTS

| 2,236,917 | 4/1941 | Pollock | 242/71.1 |
| 2,709,050 | 5/1955 | Mansberg | 242/71.1 |
| 2,721,041 | 10/1955 | Nerwin | 242/71.1 |
| 3,095,969 | 7/1963 | Morrison | 206/53 |
| 3,282,527 | 11/1966 | D'Incerti | 242/71.1 |
| 3,288,388 | 11/1966 | Winkler | 242/71.1 |

FOREIGN PATENTS OR APPLICATIONS

| 1,897,740 | 7/1964 | Germany | 242/71.1 |

Primary Examiner—Werner H. Schroeder
Attorney—James P. Hume, Patrick H. Hume, Howard W. Clement, Howard B. Rockman, Wm. Marshall Lee, Henry L. Brinks, Clyde F. Willian, Granger Cook, Jr., Richard G. Lione, Roy E. Hofer, Robert P. Cummins, Gerald D. Hosier, David A. Anderson, James P. Blanchard, Robert L. Harmon, Melvin F. Jager, Jack C. Berenzweig, John L. Cline, Raymond P. Niro and Charles E. Quarton

[57] ABSTRACT

An anti-unwrapping device usable in a cartridge accepting a reel containing film wound in convolutions about the reel hub, the outer film convolutions having a tendency to unwrap, the device having a base member from which a plurality of yieldable fingers extend with the free ends thereof arranged to engage the outermost convolution of the film.

24 Claims, 3 Drawing Figures

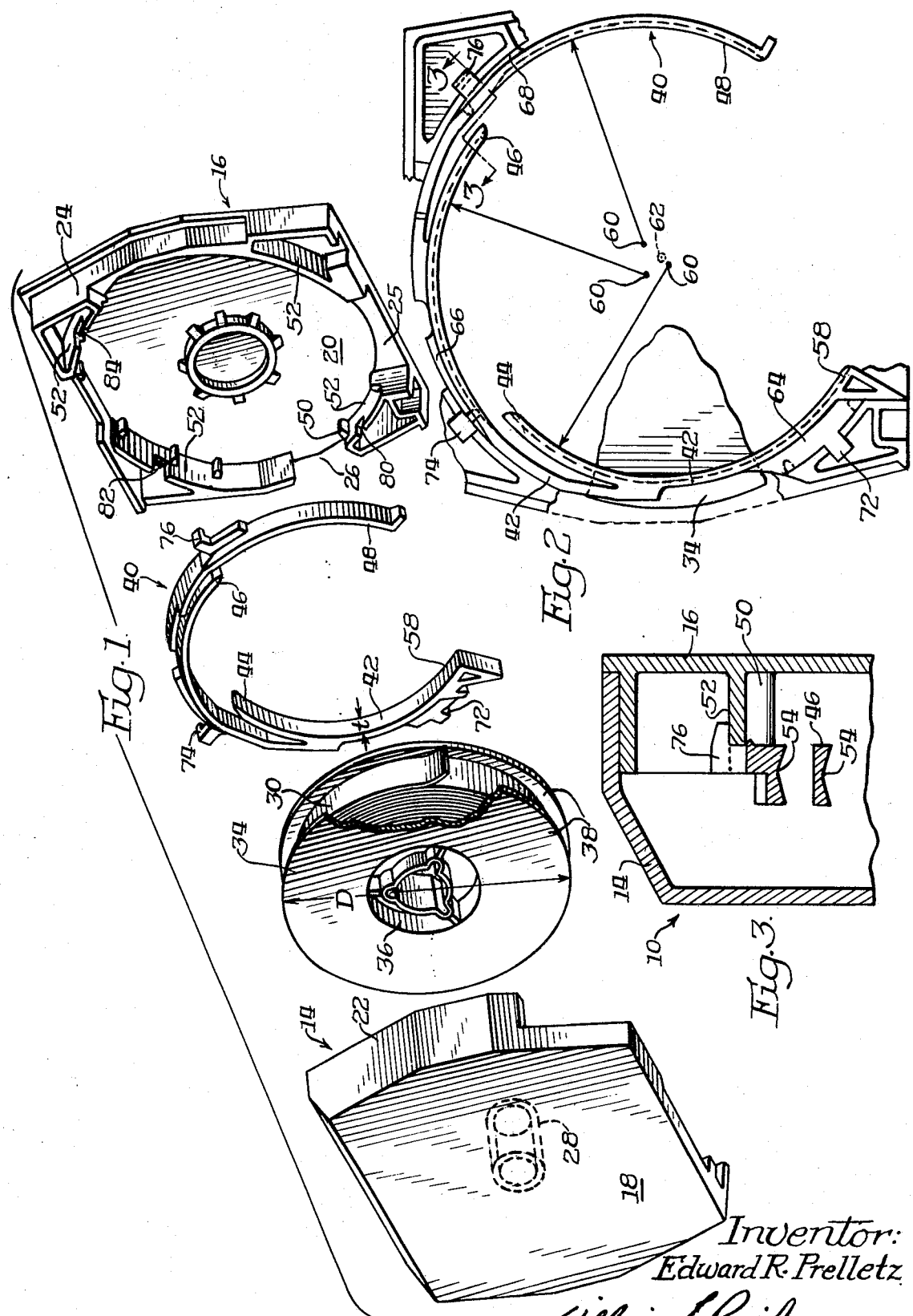

FILM CONVOLUTION RETAINING DEVICE

The present invention relates to a film retaining cartridge usable with a film handling machine, and particularly to a film anti-unwrapping device to maintain in wrapped condition the outer convolutions of a film, which when wound in convolutions, has a tendency to unwrap.

Known cartridge constructions for containing motion picture films have been successful where the operator is to manually thread the film into the machine. However, cartridges usable on machines intended for automatic threading of the film into the machine are subject to threading failure on some attempts when a film is to be automatically threaded solely by a mechanical stripping and guiding mechanism. The failures can often be traced, in machines such as motion picture projectors, to the tendency of film to unwrap unless constrained to remain in relatively tight convolutions. In such instances, the threading device of the projector is unable to engage the leading end of the film and guide it into the threading path of the projector. This inability of the threading device to perform is caused by looseness of the outer film convolutions whereby the leading end of the film moves loosely within the cartridge, but does not follow readily the internal edge wall of the cartridge.

Also, the threading device may cause shifting and deformation of the loose convolutions relative to the more tightly wound inner convolutions. The shifting tends to move the upper convolutions against the enclosure to restrict the movement of the leading end of the film therebetween and around the adjacent convolution. Since the film threading device drives by frictional engagement with the film, restricting movement of the leading end creates a greater probability of failure of the film thread.

By the use of the anti-unwrapping or retainer device of the present invention, a successful threading operation is assured since the leading end of a film cannot be restricted or jammed. The interrupted effective film guide surface of the device prevents continuous engagement of the outer convolution, and thus permits relatively unrestricted movement of the film end. Hence, the threading device is permitted to function in the manner intended.

Further, in known film containing magazines and cartridges used to supply film for cameras and projectors, anti-unwrapping devices have been constructed. However, these containers are designed to retain continuously the film supplied therein. That is, the film is transported from a supply in one portion of the container, past an opening, and to a take-up without any length of film being removed from the container. Typical containers having versions of film anti-unwrapping devices are described in U. S. Pat. Nos. 1,953,985 and 2,022,353. The devices used in the containers of these patents are arranged to engage the film at substantially one point about the circumference of the roll of film. Since the film ends are not intended to be released from the supply and take-up of the cartridge, the retainer device is not intended to prevent unwrap of the outer convolutions of the film. Hence, the intended function is different from the function of the present invention.

Other objects and features of the invention will become apparent to those skilled in the art from the following detailed description of the embodiment which appears in the drawings.

In the drawings:

FIG. 1 is an exploded perspective view of a cartridge, the anti-unwrapping device of the invention, and a reel of film;

FIG. 2 is a plan view of the cartridge section having the anti-unwrapping device supported therein; and FIG. 3 is a view taken substantially along line 3—3 of FIG. 2.

Referring to the drawings, reference numeral 10 refers generally to a cartridge having separable first and second sections 14 and 16. Each of the sections comprises a substantially planar surface 18, 20 respectively, and complementary and partial edge wall portions 22, 24. The sections, when together, form a partially closed container having selected areas of the edge walls cut out to form an access area, generally designated by the numeral 25, for a not shown threading device of a motion picture projector, a reel driver access area, generally designated by the numeral 26, and an exit and entrance area for film 30, which, in the embodiment depicted, coincides with the reel driver area. It will be understood, of course, that the three areas may be combined or discrete. When a cartridge is mounted on a machine, the access areas are generally through the downward edge and the relatively lower and adjacent portions of the side edge walls of the cartridge. The single or multiple access areas are thus positioned in association with cooperating components of the projector.

The cartridge 10 is provided with a spindle 28, adapted to receive a reel 34. About the hub 36 of reel 34, film 30 is wound in a series of convolutions. The reel has a pair of spaced flanges 38, of a predetermined diameter D, which diameter depends upon its intended capacity, or the length of film to be wound about the reel. Insofar as small capacity reels are concerned, the film wrap of all convolutions including the outermost convolution is about a relatively small diameter. Thus, unless restrained, the outer and adjacent convolutions tend to unwrap or clockspring. The degree of unwrap when a reel is within a cartridge section is limited essentially by the effective internal diameter of the cartridge edge wall surfaces. To enable a reel of a given diameter to fit in the cartridge, the effective internal surfaces of the cartridge are configured to provide a small space around the periphery of the reel.

To prevent inadvertent unwrap or clockspringing of the film or web 30, an anti-unwrapping or retainer device, generally designated by the numeral 40 is provided within the cartridge. The device, preferably molded of plastic, includes a base portion 42, and, for purposes of illustration, several yieldable spring members or fingers 44, 46, 48. It should be understood, however, that the device will perform its intended function with a lesser number of fingers. The fingers are designed to extend inwardly from the base portion relative to a circumferential circle defined by the base portion. That is, the device appears as a substantially circular member extending around substantially 270° of a circle. The open area, between the chordally spaced apart ends of the device, permits access of a threading device, and exit and entrance of a film relative to the cartridge.

Retainer device 40 is configured to be of a thickness $t$, which is approximately one-half the spacing between flanges 38 of the reel to be contained within the cartridge. Ledge portions 50, formed within cartridge section 16 adjacent rim portions 52 therein, support the base member of the device to essentially center the device between the flanges of the reel when the reel is inserted in the cartridge.

The internal peripheral surfaces of base member 42 and of the yieldable fingers of the retainer device are shaped as a "V" groove 54. The surfaces of the "V" are smooth so that a film, within the cartridge and retainer device, engages the outer riding or film contact surfaces of the "V" with low frictional contact. In this manner, whenever the film engages the retainer device, the interengaging force is insufficient to damage the film due to scratches or tearing.

Yieldable finger portions 44, 46, 48 are formed unitary with base member 42. Relative to the base member, these portions extend inwardly of the effective circle of the member. These finger portions in a free condition extend to within the periphery of the flanges 38 of the reel so as to preclude escape of the film from between the flanges. Effective or active surfaces of the finger portions are generated as involute surfaces, each surface being scribed from a center 60 displaced from the geometrical center 62 of the retainer device and of a section of the cartridge, assuming the device to be disposed centrally within the cartridge section. Aside from the most clockwise of the yieldable portions which is free-standing, base member 42, adjacent the yieldable portions, is reduced in radial depth to permit outward deflection of the portions. Hence, reels wound with a full capacity of film are acceptable within the cartridge.

Considering the retainer device in a clockwise manner as seen in FIG. 2, the initial portion of the base or first surface 42 of the device is a relatively rigid heel portion 58, formed as a relatively thicker and therefore stiffer portion than the yieldable portions 44, 46, 48. The heel portion has a circular effective surface, which surface is scribed from geometrical center 62 of the device. The heel portion is configured with a radius greater than the maximum radial extent of the yieldable portions, when the latter are in free condition. From the heel portion to the end of the most remote of the yieldable portions, the diameter therebetween is less than the diameter of the periphery of the reel contained in the cartridge. Further, the varying radii of the effective surfaces of the yieldable portions prevent the surfaces from simultaneous contact, so that the outer convolutions of film do not clamp adjacent convolutions. Since the convolutions of film are restrained against undue unwrapping and the leading end is not restricted, the end is relatively free to be unwound, and guided from the cartridge by the threading device of the projector.

Aside from possibly molding retainer device 40 unitarily with a cartridge section, the device may be supported within the cartridge section affixed to rim portions 52 either by cementing or ultrasonic welding, by frictional engagement, by clipping, or by a combination of these methods. To cement or weld the device within the cartridge, portions 64, 66, 68 are attached to the interior of the cartridge section. Likewise, these areas form the frictional engaging portions whereby a general tendency of the device to spring outwardly maintains the device substantially fixed against cooperating portions within the cartridge section.

Clip means 72, 74, 76 may also be molded externally of retainer device 40. Since the device is formed of plastic having relatively thin sections and when unmolded may spring slightly inwardly or slightly outwardly relative to the design configuration, the several clip means are arranged to engage recessed portions 80, 82, 84 in the rim portion 52 of a cartridge section. In this preferred embodiment, the clips are formed with a modified open "U" shaped cross-section so as to seat over rim portion 52 of the cartridge and to prevent radial movement of the device inwardly or outwardly of the rim portion. In addition to being seated on the rim portion in a clamping relation, these clip means may further be cemented to make the retainer device more secure within the cartridge section.

What is claimed is:

1. A web retaining device in combination with a cartridge adapted to accept a reel, having flanges, containing a web wound in convolutions around the hub of said reel, and adapted for use in automatic feed-out means, the improvement comprising:
    a plurality of yieldable elements located within said cartridge, said yieldable elements having free ends wherein said free ends extend between the flanges of said reel thereby retaining the web between said flanges; and
    access means located within said cartridge and said web retaining device adapted to enable said automatic feed-out means to pass into said cartridge to permit said web to be fed from said reel in said cartridge.

2. The web retaining device of claim 1 wherein each of said yieldable elements extends from a base member and wherein said base member is connected to said cartridge thereby orienting said device within said cartridge in a preselected position.

3. The web retaining device of claim 2 wherein said base member is substantially rigid and wherein each of said yieldable elements is adapted to substantially deflect thereby preventing said retaining device from causing said reel to bind.

4. The web retaining device of claim 3 wherein said yieldable elements define at least three resilient fingers serially connected to one another thereby forming a noncircular curve.

5. The web retaining device of claim 4 wherein said yieldable elements comprise a width less than the spacing of said reel flanges thereby causing said flanges to extend radially outwardly beyond said yieldable elements.

6. The web retaining device of claim 1 wherein said yieldable elements cooperate with each other to form a non-circular curve.

7. The web retaining device of claim 1 wherein said yieldable elements further include a "V" shaped groove configuration which is adapted to engage said web at laterally spaced points.

8. The web retaining device of claim 1 wherein said device and said cartridge comprise a unitary structure.

9. A web retaining device in combination with a cartridge adapted to accept a reel having flanges, containing a web wound in convolutions around the hub of said reel, and adapted for use in automatic feed-out means, the improvement comprising:
- a plurality of elements located within said cartridge, each of said elements having a base portion and a flexible portion extending from said base portion and wherein said flexible portions are adapted to extend between the flanges of said reel thereby retaining the web between said flanges; and
- access means located within said cartridge and said web retaining device adapted to enable said automatic feed-out means to pass into said cartridge to permit said web to be fed from said reel.

10. The web retaining device of claim 9 wherein the base portion of one of said elements is connected to a second of said elements intermediate said base portion and said flexible portion of said second element thereby forming a non-circular curve.

11. The web retaining device of claim 10 wherein said base members are substantially rigid and wherein said yieldable elements are adapted to substantially deflect thereby preventing said retaining device from causing said reel to bind.

12. The web retaining device of claim 11 further comprising a means for connecting said elements to said cartridge thereby orienting said device within said cartridge in a preselected position.

13. A cartridge for a strip of flexible web material on a reel having flanges and adapted for use in automatic feed-out means comprising:
- a reel receptacle having a substantially planar back portion;
- a cover adapted to fit over said reel receptacle to substantially enclose a reel in said receptacle wherein said reel receptacle and said cover are arranged to form a threading aperture on the bottom end of the assembled cartridge adapted to enable said automatic feed-out means to pass into said cartridge and to permit a strip of flexible web material to be fed from said reel out of said cartridge; and
- a web retaining device spaced from said back portion and positioned to penetrate the space between the flanges of said reel along a portion of the circumference of said reel, said web retaining device having a plurality of flexible elements wherein the free end of said elements is adapted to extend between the flanges of said reel thereby guiding said flexible web material through said threading aperture.

14. The cartridge of claim 13 wherein said web retaining device further comprises a base means wherein said flexible elements extend from said base means.

15. The cartridge of claim 14 wherein said base means is rigid and wherein said plurality of flexible elements are serially connected to said base means.

16. The cartridge of claim 15 wherein said flexible elements are arranged to form a non-circular curve.

17. The cartridge of claim 16 further comprising means for connecting said web retaining device to the interior of said cartridge in a preselected position.

18. The cartridge of claim 17 wherein said connecting means comprises a first groove member in said back portion and a first extending clip portion on said web retaining device whereby said clip portion engages said groove member thereby connecting said web retaining device in said cartridge.

19. The cartridge of claim 17 wherein said flexible elements further comprise a "V" shaped groove configuration which is adapted to engage said web at laterally spaced points.

20. The cartridge of claim 19 further comprising a ledge portion on said back portion whereby said web retaining device is positioned laterally against said ledge portion.

21. The cartridge of claim 16 wherein said web retaining device and said reel receptacle are integrally formed.

22. The cartridge of claim 16 wherein said web retaining device comprises three flexible elements.

23. The cartridge of claim 14 wherein each of said flexible elements comprises a first and a second end and wherein said first end of said first flexible element extends from said base means.

24. The cartridge of claim 23 wherein the first end of said second flexible element is connected to said first flexible element intermediate to the first and second ends of said first flexible element whereby said first and second flexible elements form a non-circular curve.

* * * * *